United States Patent
Montgomery

[11] 3,803,703
[45] Apr. 16, 1974

[54] WELDING OF HOLLOW CORE ALUMINUM CONDUCTORS

[75] Inventor: Ian David Montgomery, Toronto, Ontario, Canada

[73] Assignee: Canada Wire and Cable Company Limited, Tornoto, Ontario, Canada

[22] Filed: Mar. 27, 1972

[21] Appl. No.: 238,203

[30] Foreign Application Priority Data
Aug. 17, 1971  Canada.............................. 120786

[52] U.S. Cl................. 29/491, 29/498.5, 174/94 R, 219/160, 228/50, 285/286
[51] Int. Cl....................... B23k 5/22, B23k 31/02
[58] Field of Search ....... 29/470.9, 490, 491, 498.5; 174/94 R; 219/160; 228/50; 285/286

[56] References Cited
UNITED STATES PATENTS
3,163,449  12/1964  Westfall........................ 285/286 X
3,352,578  11/1967  Burke .......................... 29/498.5 X
3,415,697  12/1968  Bredzr et al. .................. 29/498.5 X

OTHER PUBLICATIONS

"Metals Handbook," Vol. 1, 8th Edition, American Society For Metals, copyright 1961, pp. 489.

Welding Kaiser Aluminum, 1st Edition, Kaiser Aluminum & Chemical Sales, Inc., copyright 1967, pp. 3–20, 3–21, 7"25 and 7–26.

*Primary Examiner*—J. Spencer Overholser
*Assistant Examiner*—Ronald J. Shore
*Attorney, Agent, or Firm*—Spencer & Kaye

[57] ABSTRACT

Hollow core aluminum conductors are joined by thermite or similar welding with the use of a tubular insert made of niobium within the hollow core ends, which insert bridges these ends with one another when the weld is applied.

4 Claims, 11 Drawing Figures

PATENTED APR 16 1974 3,803,703

PRIOR ART

FIG. 2

FIG. 3 - CROSS SECTION OF MILD STEEL BEFORE WELDING TEST.

FIG. 4 - CROSS SECTION OF STAINLESS STEEL BEFORE WELDING TEST.

FIG. 5 - CROSS SECTION OF MILD STEEL AFTER WELDING TEST.

FIG. 6 - CROSS SECTION OF STAINLESS STEEL AFTER WELDING TEST.

FIG. 7 - SHOWING LONGITUDINAL SECTION OF STAINLESS STEEL TUBE AFTER THERMITE WELDING. NOTE THE EXTENT OF DAMAGE

FIG. 8 - CROSS SECTION OF NIOBIUM TUBE BEFORE WELDING TEST

FIG. 9 - CROSS SECTION OF NIOBIUM TUBE AFTER WELDING TEST.

FIG. 10 - SHOWING LONGITUDINAL SECTION OF NIOBIUM TUBE AFTER THERMITE WELDING. NOTE THE TWO CONCENTRIC DARK RING SEGMENTS WHERE THE SURFACE HAS OXIDIZED SLIGHTLY.

THERMITE →

FIG. 11 - NIOBIUM/THERMITE INTERFACE MAG. X150

NIOBIUM →

WELDING OF HOLLOW CORE ALUMINUM CONDUCTORS

This invention relates to welding of hollow core conductors at least one of which is made of aluminum or an aluminum alloy.

More particularly, the invention relates to a novel method of joining hollow core aluminum conductors and includes the joint or weld thereby formed.

It is well known that joining or welding of aluminum conductors presents considerable difficulty because the formation of the oxide coating on aluminum conductors inhibits the solderability of aluminum by preventing the underlying base metal from being soldered or welded by conventional techniques. This oxide coating is thin, tenacious, substantially transparent and very difficult to remove.

Consequently, several special methods have been developed for welding or joining conductors at least one of which is made of aluminum. One of these is the well known thermite welding which is an exothermic welding process where no outside source of power or heat is required. According to this process, thermite powder, which may consist, for example, of a mixture of tin oxide and aluminum, is ignited by a primer, such as magnesium, whereby reduction of tin oxide by aluminum is achieved, producing a molten, super-heated tin-aluminum alloy which welds the conductors together. The welding heat is obtained from the super-heat in the molten alloy. The reaction occurs quickly and with good thermal efficiency, generating temperatures close to about 2,500° C. For this reason it is well suited for joining aluminum conductors to one another or with conductors of other metals such as copper.

The connection is carried out in a suitable mold, usually made of graphite, and consists of a molecular weld rather than a mechanical contact.

Several variations of such method exist but generally they involve the principle of causing molten, super-heated aluminum alloy to flow over the ends of the conductors to be joined whereby these ends are melted and fused into a solid homogeneous mass, thus forming the connection before the heat is dissipated by the conductors.

It should be noted that the term "aluminum conductors" used herein includes conductors made of various aluminum alloys.

It is obvious, however, that the above described welding methods cannot be applied to hollow core aluminum conductors used for oil filled cables. One way of achieving such connection between hollow core aluminum conductors that comes into mind would be to provide a tubular insert between the ends of such conductors and then apply the welding method such as described above. However, this is not an easy matter since such insert would have to withstand the extreme erosive action of the superhot thermite metal in a satisfactory manner. In other words, it would have to withstand temperatures up to about 2,500° C and posess satisfactory resistance to extreme thermal shock. Furthermore, it would have to be sufficiently tough to withstand physical abuse during the joining operation. Moreover the insert would have to possess sufficiently low thermal conductivity or sufficiently high oxidation resistance to reduce the risk of oxide scales forming on the inside thereof because loose scales in this position would contaminate the insulating oil should they become detached.

In addition to the above, the insert must be made of a material which is commercially available and easily machinable into tubular forms of desired thickness and diameter and its cost should not be too high so as not to render it economically prohibitive.

In a research program undertaken to find the suitable material for such inserts, first of all, ceramics were tried because these are materials that withstand very high temperatures. However, the thermal shock and toughness requirements mentioned above make ceramic inserts quite unsatisfactory. It was therefore decided that a metallic insert would be the only type that could meet all the requirements mentioned above if a suitable metal or alloy could be found.

In this perspective, tests were conducted with tubular inserts made of mild steel and 18/8 stainless steel using a thermite charge. It was thought that either of these two metals might prove sufficient to withstand the erosive action of the superhot weld metal because of the fast cooling rate and the brief duration of the metal flow. However, these materials were found to be entirely unsatisfactory.

Then, nickel and cobalt based heat resistant alloys were tested and again found inadequate.

Then, some high melting point metals were tried such as titanium and chromium. However, it became obvious that titanium has a very high reactivity in oxidizing conditions at temperatures above 1,000° C and therefore could not be used, while the carbon content of commercially pure chromium is such that the metal is rendered brittle and therefore not sufficiently tough to withstand the conditions for the purpose intended. Furthermore, the insert could not be readily fabricated from such metals except by expensive spark machining techniques. Some crystal grades can be successfully fabricated by conventional methods, but the cost of the metal alone is in the $250.00/lb. bracket which makes it completely prohibitive.

Then, the four refractory metals, namely: tungsten, molybdenum, niobium (columbium) and tantalum were experimented with and it was found that tungsten, molybdenum and tantalum formed complex volatile oxides at temperatures as low as 600° C. which render them completely unsuitable.

On the other hand, it was surprisingly found that niobium (columbium) withstood very well the attack of the thermite welding and satisfied all other requirements of high temperature welding process. Further experiments have established that even relatively impure metallurigical grade niobium costing between $25.00 and $40.00/lb. is entirely satisfactory for joining hollow core aluminum conductors in accordance with the present invention by a high temperature welding process and that this niobium can be readily fabricated into tubes of desired dimensions by a conventional welding process.

This unexpected result now makes it possible to join hollow core aluminum conductors by welding in a simple and efficient operation as well as in a practical and economical manner.

The invention will now be described with reference to the appended drawings in which.

Figure 1:
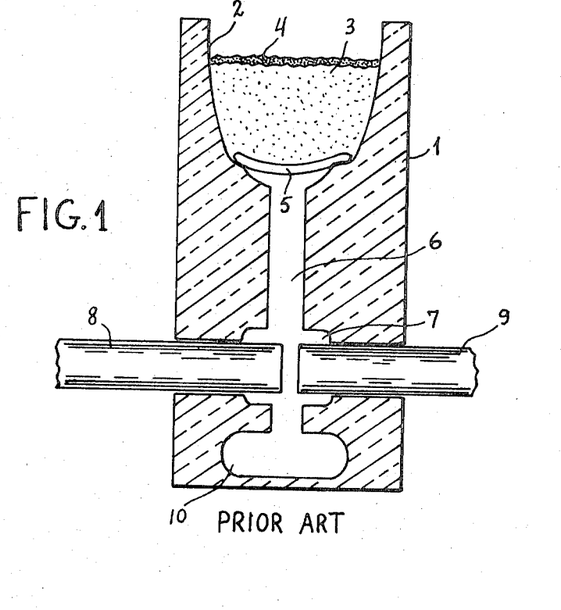
FIG. 1 is an elevation view of the arrangement now used for welding solid conductors by a thermite process, with the mold being shown in section.

The presently used process and equipment for welding aluminum conductors is illustrated in FIG. 1. For this purpose, mold 1 made of semi-permanent graphite with high resistance to temperature is utilized. This mold has an upper cavity 2 in which thermite powder 3 with a layer 4 of a priming powder on top of it is maintained by an aluminum disk 5. When the primer is ignited, the aluminum disk 5 yields under pressure and the thermite powder 3 fails through the tap hole 6 into the weld cavity 7 where the ends of conductors 8 and 9 are welded. The remainders of the reaction fall into the riser cavity 10.

Figure 2:
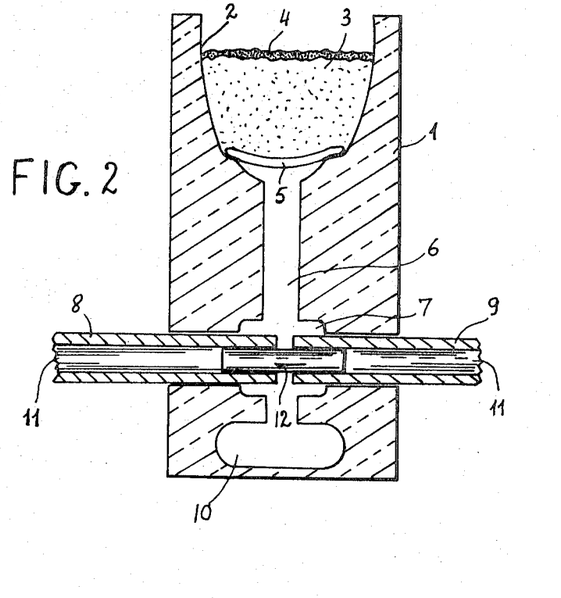
FIG. 2 is a similar view of the arrangement according to the present invention for joining hollow core conductors.
Figure 3:
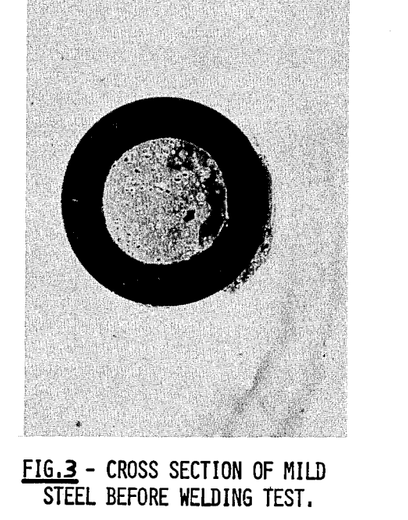
FIG. 3 is a photographic representation of a cross-section of an insert made of mild steel before the welding test.
Figure 4:
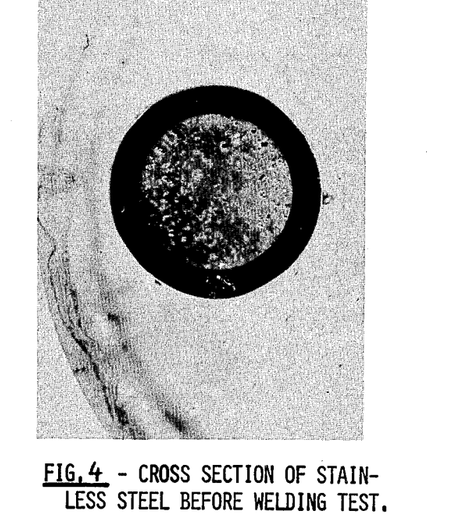
FIG. 4 is a photographic representation of an insert made of stainless steel before the welding test.
Figure 5:
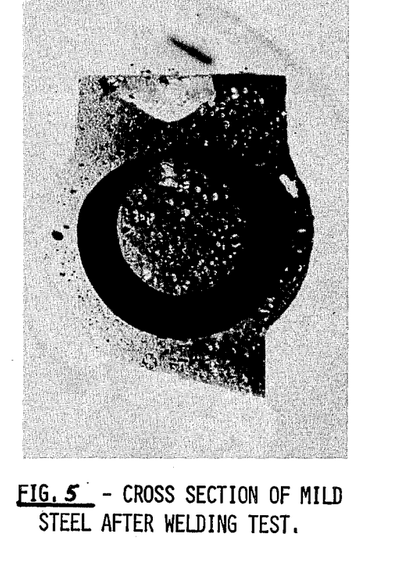
FIG. 5 is a photographic representation of a cross-section of mild steel after the welding test.
Figure 6:
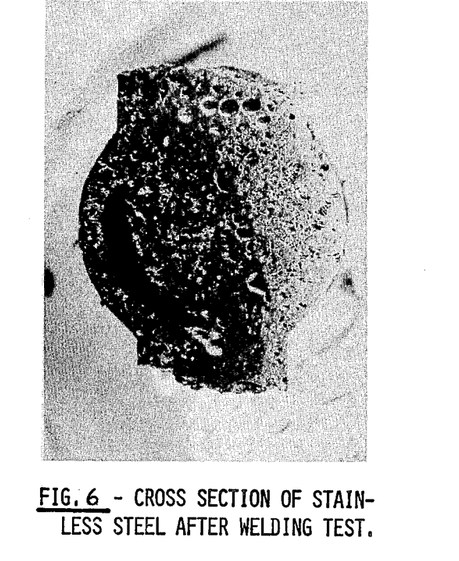
FIG. 6 is a photographic representation of a cross-section of stainless steel after the welding test.

The same system applies in accordance with the present invention as shown in FIG. 2, however, here conductors 8 and 9 have a hollow core 11 into which a niobium tube 12 is inserted. Then, as previously, primer 4 is ignited to initiate the welding.

Figure 7:
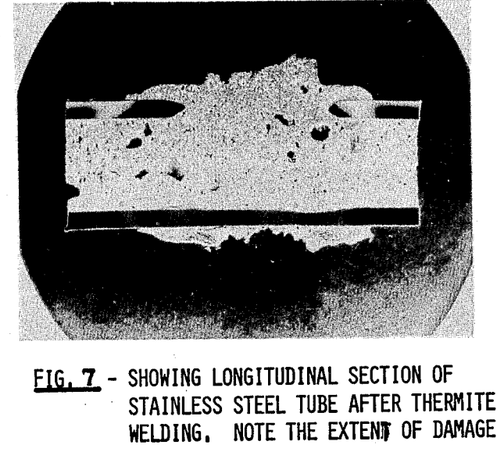
FIG. 7 is a photographic representation showing the longitudinal section of stainless steel tube after thermite welding.

FIGS. 3 to 11 inclusive illustrate quite well the experimental results carried out during the research program leading to this invention. Thus, in FIG. 3, a tube of mild steel having a wall section of 0.098 inch is shown and in FIG. 4 a tube of 18/8 stainless steel having a wall section of 0.062 inch is illustrated. These tubes were then used in the process as described above and FIGS. 5 and 6 show respectively their cross-sections after the welding test. It should be noted that the most severe conditions are experienced at the top of the tube where the stream of the thermite metal diverges. It was also interesting to note that the mild steel fared better than its stainless steel counterpart the longitudinal section of which is illustrated in FIG. 7.

Figure 8:
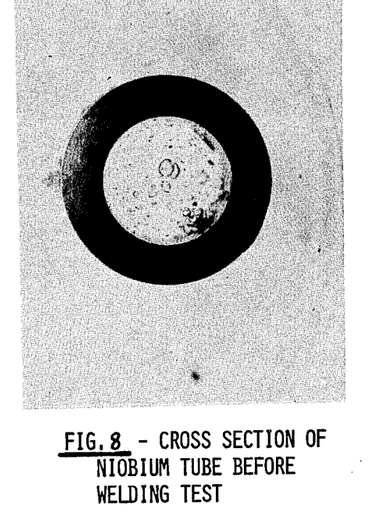
FIG. 8 is a photographic representation of a cross-section of niobium tube before the welding test.
Figure 9:
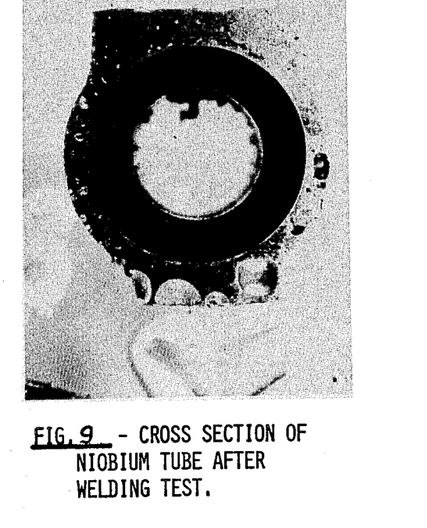
FIG. 9 is a photographic representation of a cross-section of the niobium tube after the welding test.

In FIG. 8, the tube made of metallurigical grade niobium and having a wall section of 0.100 inch is illustrated before the welding test. The same tube is shown in FIG. 9 after the welding test and in FIG. 10 the longitudinal section of this tube after the welding test is illustrated. It is clear from these photographic representations that the niobium tube produced satisfactory results. Metallurigical examination at the thermite/niobium interface indicated that the portion of the tube where the metal stream diverged was the only position to suffer a very minor attack. This niobium thermite interface is shown in FIG. 11 magnified 150 times. The fact that the niobium goes into solution as a compound rather than dissolving into a primary phase indicates that the reduction in conductivity expected at the joint is very small. The degree of attack was only in the order of 1 – 2 mils.

It should be understood that the invention is not limited to the specifically described and illustrated embodiments but that many modifications obvious to those skilled in the art can be made without departing from the spirit and scope of the invention. Thus, various high temperature welding processes can be applied using the same principle and niobium tubes can be made of various shapes and forms depending on the hollow core of the conductor and can have predetermined wall thicknesses most desirable for a particular method or conductor. The niobium can also be associated or alloyed with minor quantities of other elements or impurities but basically the metallurgical grade niobium which is most easily available at the lowest cost is quite suitable.

I claim:

1. Method of end-to-end joining of hollow core electrical conductors at least one of which is of aluminum or an aluminum alloy, which method comprises inserting a tube made of niobium into the hollow core ends of the conductors to be joined so as to bridge said ends by said tube of niobium, and then joining said conductors by means of a high temperature thermite welding process.

2. Method according to claim 1, wherein both conductors to be joined are made of aluminum.

3. Method according to claim 1, wherein both conductors to be joined are made of an aluminum alloy.

4. Method according to claim 1, wherein the joining is done by thermite welding, which generates temperatures of the order of 2,500° C.

* * * * *

UNITED STATES PATENT OFFICE
CERTIFICATE OF CORRECTION

Patent No. 3,803,703          Dated April 16, 1974

Inventor(s) Ian David Montgomery

It is certified that error appears in the above-identified patent and that said Letters Patent are hereby corrected as shown below:

In the Letters Patent Only, insert Sheets 2, 3 and 4, as shown on the attached sheets.

Signed and sealed this 3rd day of December 1974.

(SEAL)
Attest:

McCOY M. GIBSON JR.
Attesting Officer

C. MARSHALL DANN
Commissioner of Patents

FIG. 3 - CROSS SECTION OF MILD STEEL BEFORE WELDING TEST.

FIG. 4 - CROSS SECTION OF STAINLESS STEEL BEFORE WELDING TEST.

FIG. 5 - CROSS SECTION OF MILD STEEL AFTER WELDING TEST.

FIG. 6 - CROSS SECTION OF STAINLESS STEEL AFTER WELDING TEST.

FIG. 7 - SHOWING LONGITUDINAL SECTION OF STAINLESS STEEL TUBE AFTER THERMITE WELDING. NOTE THE EXTENT OF DAMAGE

FIG. 8 - CROSS SECTION OF NIOBIUM TUBE BEFORE WELDING TEST

FIG. 9 - CROSS SECTION OF NIOBIUM TUBE AFTER WELDING TEST.

Figure 10:
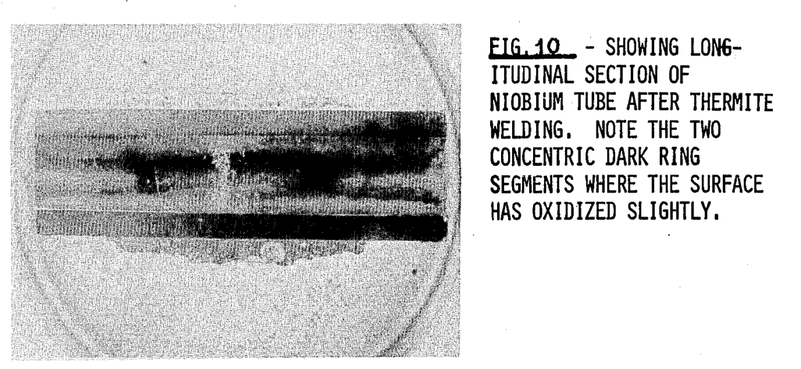
FIG. 10 is a photographic representation of the longitudinal section of niobium tube after thermite welding.
Figure 11:
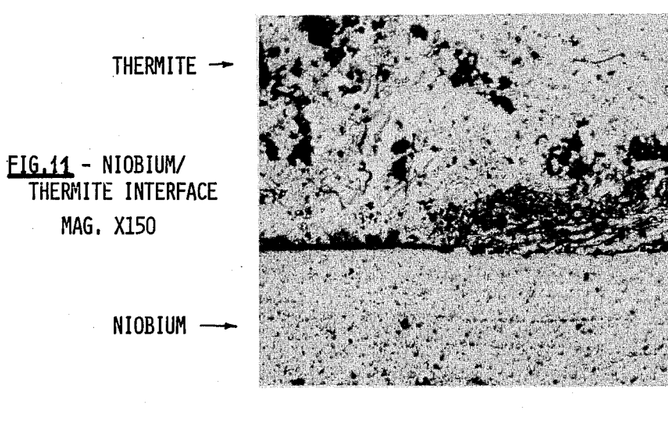
FIG. 11 is a photographic representation of the niobium/thermite interface magnified 150 times.

FIG. 10 — SHOWING LONGITUDINAL SECTION OF NIOBIUM TUBE AFTER THERMITE WELDING. NOTE THE TWO CONCENTRIC DARK RING SEGMENTS WHERE THE SURFACE HAS OXIDIZED SLIGHTLY.

FIG. 11 — NIOBIUM/THERMITE INTERFACE MAG. X150